United States Patent
Bollinger et al.

(10) Patent No.: US 12,435,839 B2
(45) Date of Patent: *Oct. 7, 2025

(54) DRY VAPOR DEWAR TEMPERATURE MONITORING RETROFIT LID ADAPTER

(71) Applicant: Cryoport, Inc., Brentwood, TN (US)

(72) Inventors: Bret Bollinger, Yorba Linda, CA (US); Ben Lee, Corona, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/060,394

(22) Filed: Feb. 21, 2025

(65) Prior Publication Data

US 2025/0230903 A1  Jul. 17, 2025

Related U.S. Application Data

(63) Continuation of application No. 18/136,821, filed on Apr. 19, 2023, which is a continuation of application
(Continued)

(51) Int. Cl.
*F17C 13/00* (2006.01)
*F17C 13/02* (2006.01)
*F17C 13/06* (2006.01)

(52) U.S. Cl.
CPC .......... *F17C 13/026* (2013.01); *F17C 13/025* (2013.01); *F17C 13/06* (2013.01);
(Continued)

(58) Field of Classification Search
CPC ........ F17C 3/06; F17C 13/025; F17C 13/026; F17C 2205/0311; F17C 2270/0509
See application file for complete search history.

(56) References Cited

U.S. PATENT DOCUMENTS 11,662,063 B2    5/2023   Bollinger et al.
2002/0166326 A1  11/2002  Giesy
(Continued)

FOREIGN PATENT DOCUMENTS

CN    104697610 A    6/2015
CN    104913188 A    9/2015
(Continued)

OTHER PUBLICATIONS

CN; First Office Action dated Dec. 14, 2024 in Application Serial No. 202080098019.8.
(Continued)

*Primary Examiner* — Brian M King
(74) *Attorney, Agent, or Firm* — Snell & Wilmer L.L.P.

(57) ABSTRACT

Method, system, apparatus, and/or device for monitoring a shipment. The vapor plug system includes a vapor plug. The vapor plug fits onto a shipper and partially seals contents within a payload area of a shipper. The vapor plug system includes a sensor that is configured to measure or determine a condition or location of the shipper. The vapor plug system includes an electronic device that has a display. The display is configured to provide the condition or the location to a user. The vapor plug system includes a vapor plug adapter. The vapor plug adapter includes a recessed pocket that is configured to receive the electronic device. The vapor plug adapter includes an opening within the recessed pocket and is configured to receive the sensor and allow the sensor to be inserted into the payload area of the shipper.

15 Claims, 6 Drawing Sheets

Related U.S. Application Data

No. 16/742,618, filed on Jan. 14, 2020, now Pat. No. 11,662,063.

(52) U.S. Cl.
CPC ............ *F17C 2205/0311* (2013.01); *F17C 2270/0509* (2013.01)

(56) References Cited

U.S. PATENT DOCUMENTS

| | | |
|---|---|---|
| 2004/0045608 A1 | 3/2004 | Peters et al. |
| 2005/0190070 A1 | 9/2005 | Rudduck |
| 2008/0307800 A1 | 12/2008 | Levin |
| 2010/0000905 A1 | 1/2010 | Wang |
| 2012/0000918 A1 | 1/2012 | Deane et al. |
| 2018/0112825 A1 | 4/2018 | Kriese |
| 2019/0063688 A1 | 2/2019 | McCormick |
| 2019/0150427 A1 | 5/2019 | McCormick |
| 2021/0215299 A1 | 7/2021 | Bollinger et al. |
| 2024/0076117 A1 | 3/2024 | Wallin et al. |

FOREIGN PATENT DOCUMENTS

| | | |
|---|---|---|
| KR | 20140062606 A | 5/2014 |
| WO | 02070361 A1 | 9/2002 |
| WO | 2019046707 A1 | 3/2019 |
| WO | 20020009999 A1 | 1/2020 |

OTHER PUBLICATIONS

JP; Notice of Allowance dated May 15, 2024 in Application Serial No. 2022-543060.
UK; Intent to Grant dated Feb. 28, 2024 in UK Application No. 2210127.3.
EPO; Extended Search Report dated Jan. 25, 2024 in EP Application No. 20914369.2.
UK; 2nd Examination Report dated Jan. 30, 2023 in Application No. 2210127.3.
JPO; Notice of Reasons for Rejection dated Oct. 3, 2023 in Application No. 2022-543060.
UK; Examination Report dated Jul. 18, 2023 in Application No. GB2210127.3.
PCT; International Preliminary Report on Patentability (IPRP) dated Jul. 19, 2022 in PCT Application No. PCT/US2020/013540.
PCT; International Search Report & Written Opinion dated Oct. 6, 2020 in PCT Application No. PCT/US2020/013540.
USPTO; Final Office Action dated Nov. 22, 2024 in U.S. Appl. No. 18/136,821.
USPTO; Non-Final Office Action dated Nov. 27, 2023 in U.S. Appl. No. 18/136,821.
USPTO; Non-Final Office Action dated Sep. 12, 2022 in U.S. Appl. No. 16/742,618.
CN; Decision of Rejection dated Jun. 21, 2025 in Application Serial No. 202080098019.8.

FIG. 4

DRY VAPOR DEWAR TEMPERATURE MONITORING RETROFIT LID ADAPTER

CROSS REFERENCE TO RELATED APPLICATIONS

This application is a continuation of and claims priority to U.S. patent application Ser. No. 18/136,821, entitled "DRY VAPOR DEWAR TEMPERATURE MONITORING RETROFIT LID ADAPTER," which was filed on Apr. 19, 2023 (the "821 Application"). U.S. patent application Ser. No. 18/136,821 is a continuation of and claims priority to U.S. patent application Ser. No. 16/742,618 (the "618 Application") entitled "DRY VAPOR DEWAR TEMPERATURE MONITORING RETROFIT LID ADAPTER" filed on Jan. 14, 2020, now U.S. Pat. No. 11,662,063, issued May 30, 2023. Each application is hereby incorporated by reference herein in its entirety.

BACKGROUND

1. Field

This specification relates to a system, device or apparatus for a dry vapor shipper lid adapter.

2. Description of the Related Art

In the shipping business, certain types of contents and cargo require extra special care. This need is very apparent when shipping biological samples and specimens. Businesses, hospitals, labs and other research or consumer facilities need to ship biological material that is highly susceptible to cellular degradation, and so, they require cryogenic shipping services to ship the biological material at cryogenic temperatures at approximately-150 degrees Celsius. The shipping of these temperature controlled materials requires special equipment, such as a dry vapor shipper or dewar that is validated to maintain the cryogenic temperature for an extended period of time, to prevent or avoid cell degradation or loss. For example, a dry vapor shipper is a metallic flask that has a payload area or well that holds the biological material within at cryogenic temperatures for a long period of time to allow the transport of the biological material.

Moreover, these temperature controlled materials require logistics support and regular monitoring of the controlled materials during shipment to maintain the integrity of the biological material. During shipment, the progress of the shipment may need to be tracked to remedy any issues within the supply chain to protect the temperature controlled materials during transit. Since these various materials are extremely temperature and/or environmentally sensitive, these materials must be maintained in a constant controlled environment during the entire shipment process, and so, the temperature and/or other environmental variables need to be monitored and controlled throughout the entire shipment process.

When shipping, customers may require internal temperature monitoring, external temperature monitoring and other monitoring and data logging of the dry vapor shipper for clinical trials and commercial, medical and industrial shipments. Dry vapor shippers, however, do not have integrated temperature or data monitoring capabilities because there is no standard data logger, temperature monitor and/or dry vapor shipper.

Instead, dry vapor shipper manufacturers rely on third parties to provide the data loggers and/or temperature monitors. The various data loggers and/or temperature monitors have various types and models from various manufacturers. The various data loggers and/or temperature monitors range from inexpensive units that only monitor internal temperature to sophisticated complex units that measure other sensor data. Due to the various different types and models of data loggers and/or temperature monitors, the dry vapor shipper manufactures cannot anticipate the type of data logger and/or temperature monitor that the customer requires. Thus, the dry vapor shipper manufacture does not address the issue of providing an integrated temperature or data monitoring capability. And so, the dry vapor shipper manufacturer does not modify the cap, lid, or vapor plug of the dry vapor shipper to accommodate the data logger and/or temperature monitor.

Accordingly, there is a need for a system, device or apparatus to accommodate and/or integrate the use of the data logger and/or other monitoring devices with the dry vapor shipper.

SUMMARY

In general, one aspect of the subject matter described in this specification is embodied in a vapor plug system. The vapor plug system includes a vapor plug. The vapor plug is configured to fit onto a shipper and partially seal contents within a payload area of the shipper. The vapor plug system includes a sensor. The sensor is configured to measure or determine a condition or location of the shipper. The vapor plug system includes an electronic device that is coupled to the sensor and has a display. The display is configured to provide the condition or the location to a user. The vapor plug system includes a vapor plug adapter. The vapor plug adapter is coupled to the vapor plug and configured to cover the vapor plug. The vapor plug adapter includes a recessed pocket that is configured to receive the electronic device. The vapor plug adapter includes an opening within the recessed pocket that is configured to receive the sensor and allow the sensor to be inserted into the payload area of the shipper.

These and other embodiments may optionally include one or more of the following features. The sensor may include a thermocouple. The thermocouple may be configured to measure an internal or an external temperature of the shipper. The thermocouple may have a wire. The opening may receive the wire that is inserted into the payload area of the shipper. The sensor may be a global positioning system. The global positioning system may be configured to determine the location of the shipper. The sensor may be a pressure sensor. The pressure sensor may be configured to measure an atmospheric pressure within the shipper. The sensor may be an inclinometer that is configured to measure tilt of the shipper or a piezoelectric to that is configured to measure shock within or to the shipper.

The vapor plug adapter may have a lid that includes the recessed pocket and the opening. The lid may be a thin-walled lid. The vapor plug adapter may have a cover. The cover may be configured to fit within the recessed pocket and may enclose the electronic device and/or the sensor within the vapor plug adapter, the vapor plug and the shipper. The shipper may be a dewar and may be designed to withstand cryogenic temperatures. The electronic device may be a data logger. The vapor plug adapter may be configured to house, couple with or be integrated with various types of data loggers, sensors and dewars of different sizes and shapes.

In another aspect, the subject matter is embodied in a vapor plug adapter. The vapor plug adapter has a vapor plug lid. The vapor plug lid has a recessed pocket. The recessed pocket is configured to receive an electronic device and has an opening. The opening is configured to receive a sensor and allow the sensor to be inserted into a payload area of a dewar. The vapor plug adapter has a cover. The cover is configured to cover and enclose the electronic device within the recessed pocket.

In another aspect, the subject matter is embodied in a vapor plug system. The vapor plug system includes a dewar and a vapor plug coupled to the dewar. The vapor plug system includes a sensor. The sensor is configured to measure or determine a condition or a location of the dewar. The vapor plug system includes a data logger. The data logger is coupled to the sensor and has a display. The display is configured to provide the condition or the location to a user. The vapor plug system includes an adapter. The adapter is coupled to the vapor plug and configured to cover the vapor plug. The adapter includes a lid having a pocket recessed within. The lid is configured to receive the data logger. The pocket has an opening that is configured to receive the sensor and allow the sensor to be inserted into a payload area of the dewar.

In another aspect, the subject matter is embodied in a vapor plug system. The vapor plug system includes a vapor plug configured to fit onto a shipper and partially seal contents within a payload area of the shipper. The vapor plug system includes an electronic device. The electronic device has a display configured to provide a condition or a location of the shipper to a user. The vapor plug system includes a vapor plug adapter. The vapor plug adapter is coupled to the vapor plug and configured to be fitted on the vapor plug and hold the electronic device.

In another aspect, the subject matter is embodied in a method of transporting a shipper. The method includes providing a shipper to store or transport contents within a payload area of the shipper. The method includes providing a vapor plug to partially seal the contents within the payload area of the shipper. The method includes fitting a vapor plug adapter onto the vapor plug. The method includes positioning an electronic device within the vapor plug adapter and a sensor within the payload area of the shipper. The method includes partially sealing the contents within the shipper using the vapor plug.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses and devices for a dry vapor shipper vapor plug retrofit lid adapter ("vapor plug adapter"). The system, apparatus or device may be a vapor plug adapter that integrates an electronic device, a monitoring device and/or a sensor that captures internal data and external data related to the dewar, contents of the dewar, and/or the shipment of the dewar. The electronic device and the monitoring device (hereinafter, referred to as the "electronic and/or monitoring device") may be a single device or multiple separate physical devices. Particular embodiments of the subject matter described in this specification may be implemented to realize one or more of the following advantages. The vapor plug adapter integrates, includes or couples with an electronic and/or monitoring device, such as a data logger, and/or a sensor, such as a thermocouple or other sensor to monitor the internal or external temperature, pressure, tilt, shock, location or other data of the dewar. The electronic and/or monitoring device may detect, provide, transmit or otherwise communicate the data to a remote server so that the data may be displayed or provided to the customer. This allows the customer to monitor the shipment of the dewar and/or the internal data related to the contents of the dewar in real-time during shipment.

Other benefits and advantages of the vapor plug adapter includes the capability to be retro-fitted, integrated with and/or adapted to various vapor plugs and/or dewars. Typically, manufacturers of dewars do not make specific vapor plugs for specific data loggers, and so, the lids of the vapor plugs need to be modified or customized for the specific data logger that the customer desires. The vapor plug adapter, however, allows the manufacturer to integrate various types of electronic and/or monitoring devices with dewars of different sizes and/or shapes. This allows the dry vapor shipper manufacturer to integrate different combinations of electronic and/or monitoring devices, sensors, vapor plugs and/or dewars of different sizes and/or shapes so that the dry vapor shipper manufacturer can accommodate or meet different customer requirements for monitoring customer shipments.

Additionally, the vapor plug adapter protects the electronic and/or monitoring device from exposure to liquid nitrogen vapors and other potential hazards. The vapor plug adapter allows access to the electronic and/or monitoring device with minimal manipulation. The vapor plug adapter may have a transparent lid to allow for ease of viewing the display of the electronic and/or monitoring device to view the internal and/or external data related to the contents of the dewar, the dewar and/or the shipment of the dewar.

Figure 1A:
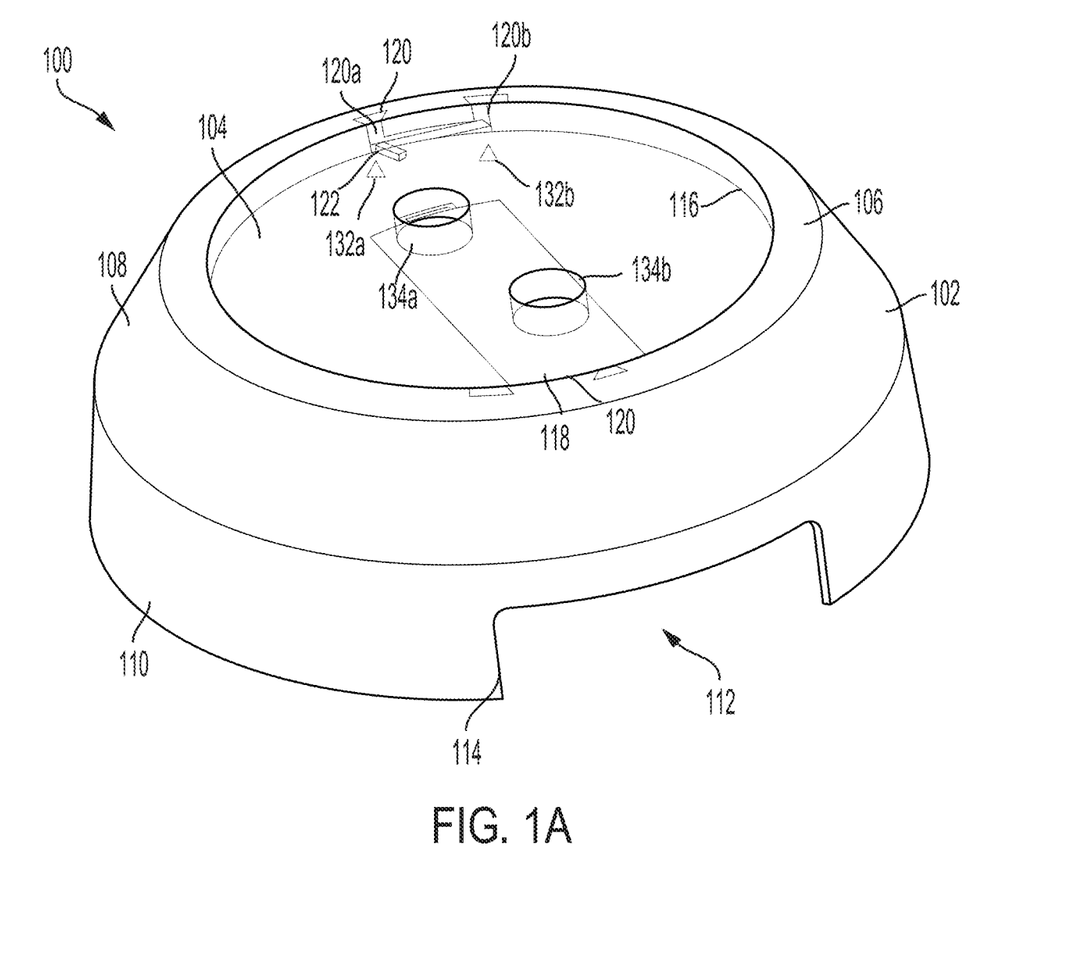
FIG. 1A shows an example dry vapor shipper vapor plug adapter according to an aspect of the invention.
Figure 1B:
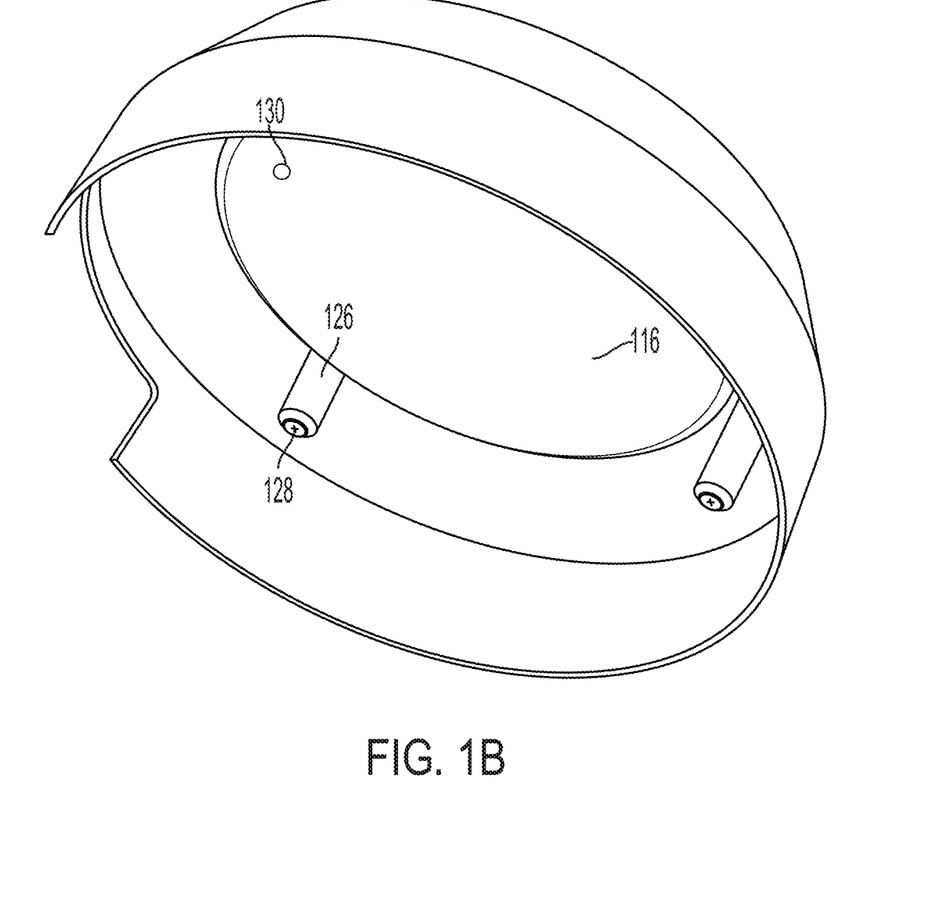
FIG. 1B shows a bottom perspective view of the dry vapor shipper vapor plug adapter of FIG. 1 according to an aspect of the invention.

FIG. 1A shows the vapor plug adapter 100, and FIG. 1B shows a bottom perspective view of the vapor plug adapter 100. The vapor plug adapter 100 includes a vapor plug lid 102, cap or other cover which may be modified and/or retro-fitted onto a vapor plug of a dry vapor shipper. The vapor plug adapter 100 includes a lid cover 104 that couples, snaps on or otherwise fastens to the vapor plug lid 102 to cover and protect an electronic and/or monitoring device, such as a data logger, and/or a sensor positioned within the vapor plug lid 102, vapor plug 202 and/or dry vapor shipper, such as a dewar 402.

Figure 2:
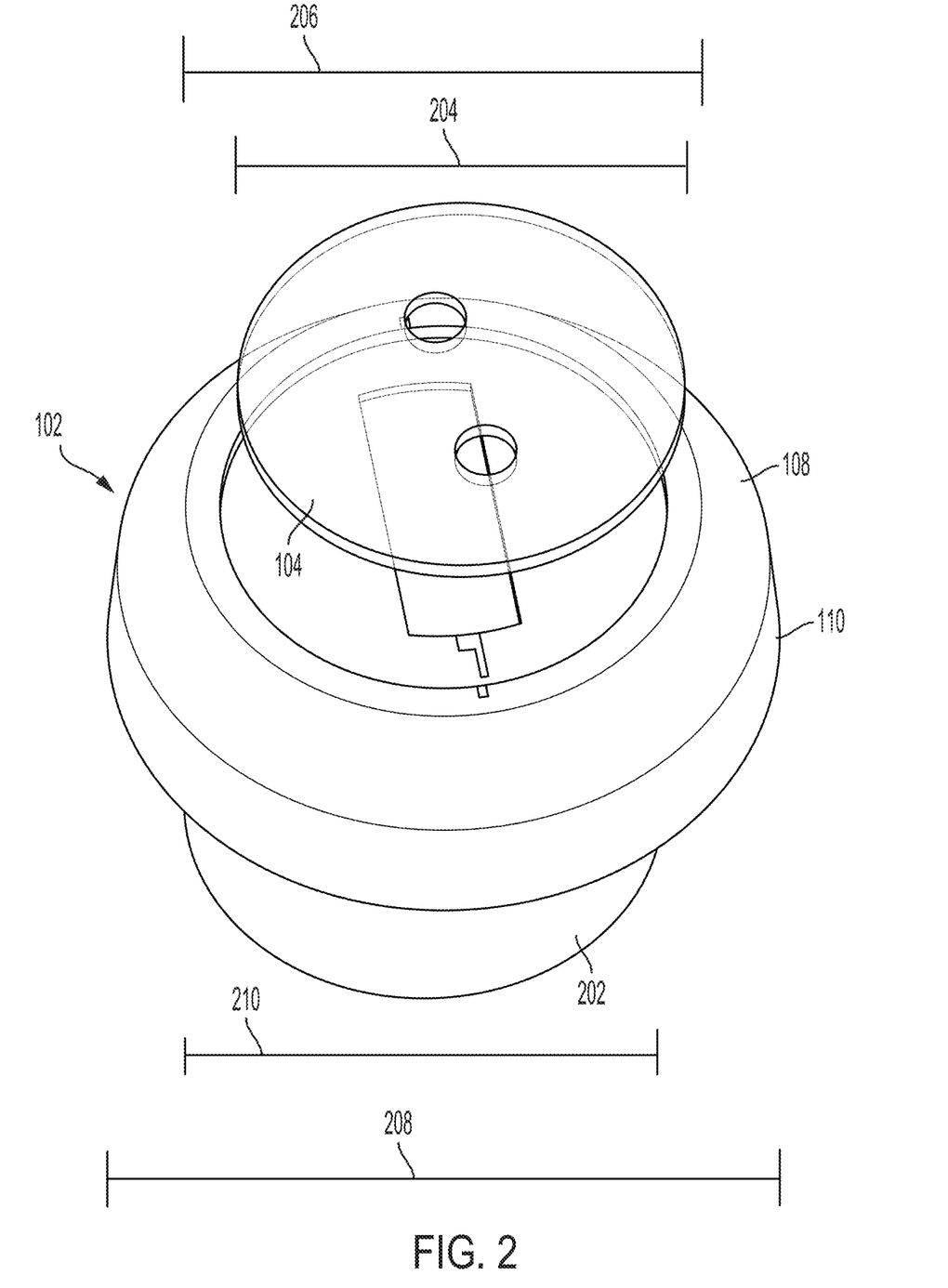
FIG. 2 shows the dry vapor shipper vapor plug adapter of FIGS. 1A-1B coupled to the vapor plug according to an aspect of the invention.
Figure 4:
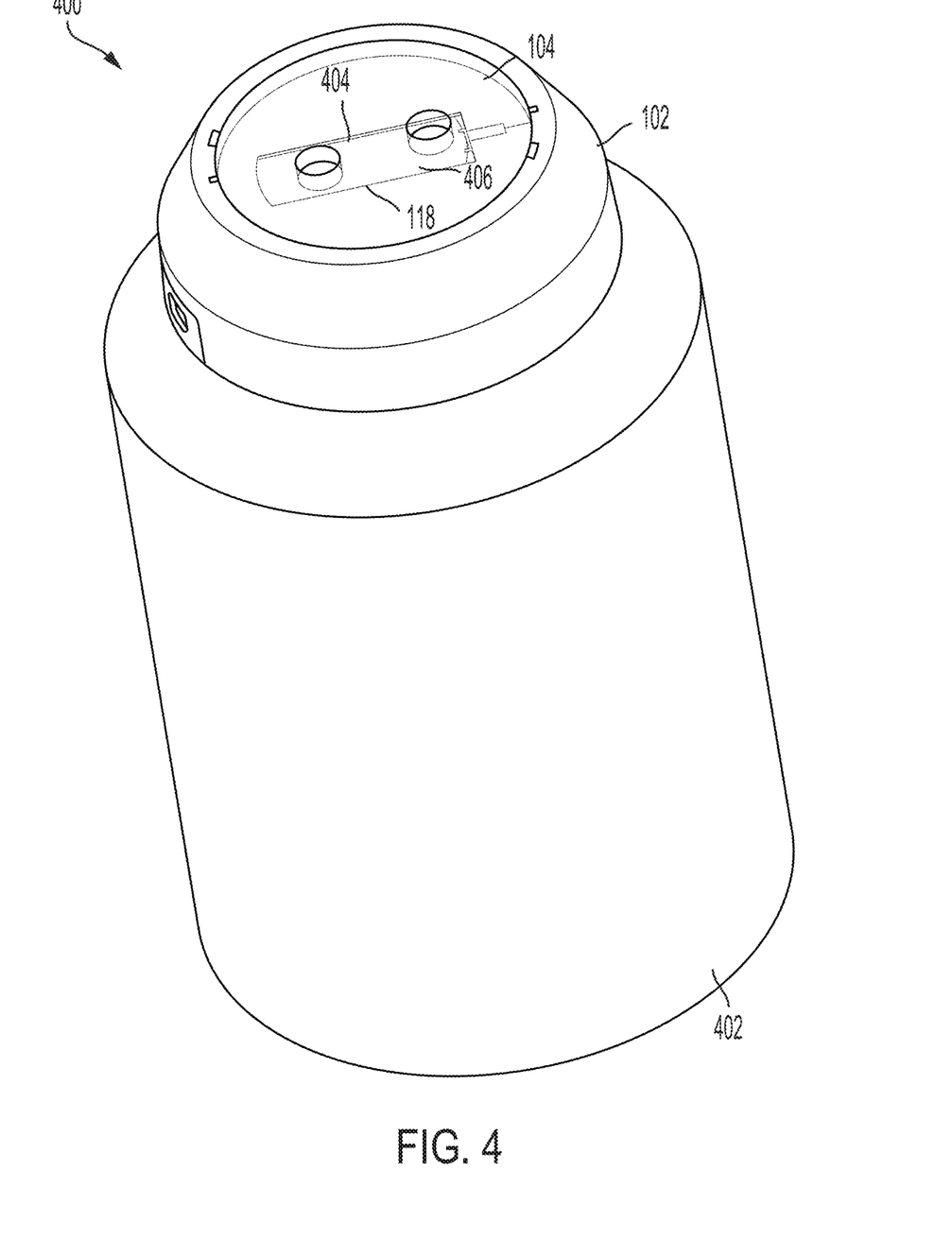
FIG. 4 shows an example dry vapor plug system with the dry vapor shipper vapor plug adapter of FIG. 1 according to an aspect of the invention.

The vapor plug lid 102 may be shaped, scaled or otherwise modified, to fit around various different types of vapor plugs of various dry vapor shippers, such as various dewars. For example, the vapor plug lid 102 may have a ridge on a bottom edge of the vapor plug lid 102 to hook onto the vapor plug 202 so that when the vapor plug lid 102 is pushed onto the vapor plug 202, the vapor plug adapter 100 will snap or couple with the vapor plug 202. The vapor plug adapter 100 may then be twisted or rotated to lock onto the vapor plug 202, as shown in FIG. 2 for example. This allows the vapor plug lid 102 to be fitted or fastened around various types of vapor plugs of various dry vapor shippers while allowing the use of various electronic and/or monitoring devices and/or sensors. Thus, various configurations of different types of electronic and/or monitoring devices, sensors, and/or dry vapor shippers may be used and monitored in real-time during shipment of the dry vapor shipper. FIG. 4 shows one example configuration of the vapor plug adapter 100, electronic and/or monitoring device 404, vapor plug 202 and dewar 402.

The vapor plug lid 102 may be made of polytetrafluoroethylene (PTFE), polyethylene or other polymer or material designed to be resistant to cryogenic temperatures. The vapor plug lid 102 has a top portion 106, an overhang 110, a middle portion 108 that interfaces between the top portion 106 and the overhang 110, and a bottom portion 112. The middle portion 108 may extend or be angled outward from the top portion 106 to connect the top portion 106 with the overhang 110. The overhang 110 may extend, project or otherwise hang or suspend downward from the middle portion 108 in parallel with a side surface of a vapor plug 202. The overhang 110 may have one or more cut-outs 114 within the overhang 110. The one or more cut-outs 114 may facilitate the fastening of the vapor plug 202 to a dewar 402 via a hinge, tether or other fastener. For example, the one or more cut-outs 114 may allow the vapor plug adapter 100 to be fitted onto a vapor plug 202 without interfering with the fastening of the vapor plug 202 to the dewar 402.

The vapor plug adapter 100 may have a pocket 116. The pocket 116 may be recessed within the top portion 106 and extend outward from the bottom portion 112 of the vapor plug lid 102. The pocket 116 may receive the lid cover 104 such that the lid cover 104 does not protrude out of the pocket 116 when the lid cover 104 is placed in and rests within the pocket 116.

The pocket 116 may be sized and shaped to receive various types of electronic and/or monitoring devices within. In some implementations, the electronic device and/or monitoring device may be a single device or multiple devices. The pocket 116 may have a recessed portion 118 that receives the electronic and/or monitoring device. For example, the recessed portion 118 may be shaped as a rectangle and have a depth such that the electronic and/or monitoring device does not protrude from the recessed portion 118 when inserted or placed within the recessed portion 118. In another example, the recessed portion 118 may be shaped as a triangle, square or other polygonal shape that is shaped to fit the electronic and/or monitoring device.

The pocket 116 may have one or more lid cover notches 120. The one or more lid cover notches 120 may be positioned within an inner circumference of the pocket 116 of the vapor plug lid 102 to receive the one or more protrusions 122 when the lid cover 104 is inserted, placed or otherwise positioned within the pocket 116. The one or more lid cover notches 120 may include multiple lid cover notches 120. The multiple lid cover notches 120 may be positioned equidistant apart and/or opposite one another along the circumference of the pocket 116.

Each of the one or more lid cover notches 120 may have a vertical channel 120a and a lateral horizontal channel (or "lateral channel") 120b or may be otherwise designed to allow the lid cover 104 to be locked and unlocked. The vertical channel 120a may be aligned with and receive a corresponding one of the one or more protrusions 122 to insert the lid cover 104 within the pocket 116. The lateral channel 120b may be perpendicular to and/or integrally formed with the vertical channel 120a. The lateral channel 102b may have a proximal end and a distal end. The proximal end may be integrally formed with the vertical channel. The lateral channel 102b allows the lid cover 104 to be locked or unlocked when the one or more protrusions 122 are slid or moved within the lateral channel 120b. When the lid cover 104 is twisted or rotated such that the one or more protrusions are slid from a proximal end of the lateral channel 120b to a distal end of the lateral channel 120b, the lateral channel 120b prevents the one or more protrusions 122 from exiting the vertical channel 120a.

For example, the vertical channel 120a may receive the one or more protrusions 122 as the lid cover 104 is inserted into pocket 116 of the vapor plug lid 102. Once the lid cover 104 is seated within the pocket 116, the lid cover 104 may be twisted or rotated in one direction clockwise or counter-clockwise so that the one or more protrusions 122 slide or move toward the distal end of the lateral channel 120b away from the vertical channel 120a. This rotation or movement slides the one or more protrusions 122 away from the vertical channel 120a and locks the lid cover 104 within the pocket 116 of the vapor plug lid 102, as shown in FIG. 1A for example. In another example, when the lid cover 104 is seated within the pocket 116, the lid cover 104 may be twisted or rotated in another direction clockwise or counter-clockwise so that the one or more protrusions 122 slide or move along the lateral channel 120b toward the vertical channel 120a. This rotation or movement that slides the one or more protrusions 122 toward the vertical channel 120a unlocks the lid cover 104 and allows the lid cover 104 to be removed from the pocket 116 of the vapor plug lid 102 when the one or more protrusions 122 are aligned with the vertical channel 120a.

In some implementations, a clockwise rotation of the lid cover 104 when seated within the pocket 116 locks the lid cover 104 into the vapor plug lid 102, and a counter-clockwise rotation of the lid cover 104 when seated within the pocket 116 unlocks the lid cover 104 from the vapor plug lid 102. In other implementations, a clockwise rotation of the lid cover 104 when seated within the pocket 116 unlocks the lid cover 104 from the vapor plug lid 102, and a counter-clockwise rotation of the lid cover 104 when seated locks the lid cover 104 into the vapor plug lid 102.

Figure 3A:
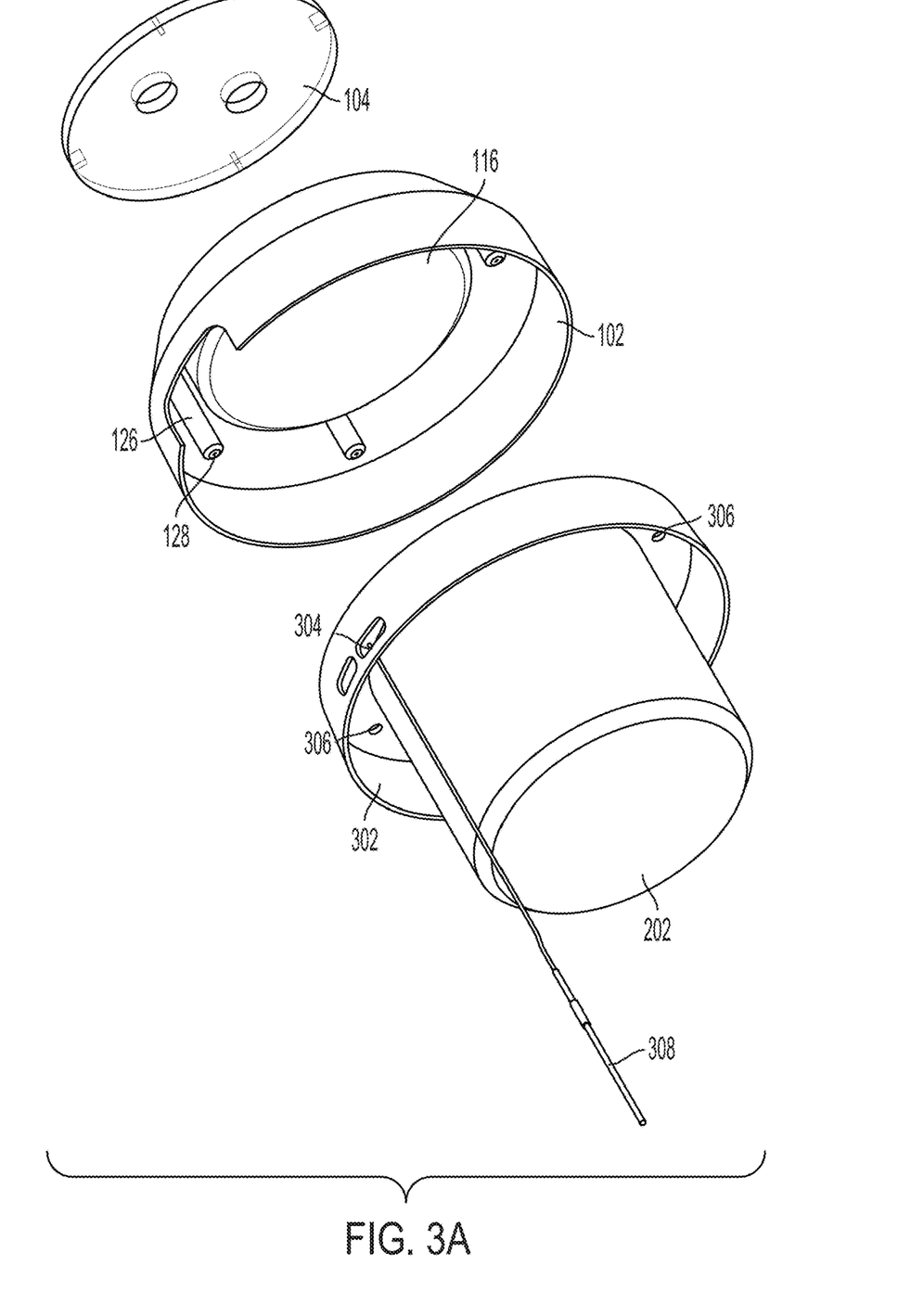
FIG. 3A shows an exploded view of the dry vapor shipper vapor plug adapter of FIGS. 1A-1B and the vapor plug according to an aspect of the invention.
Figure 3B:
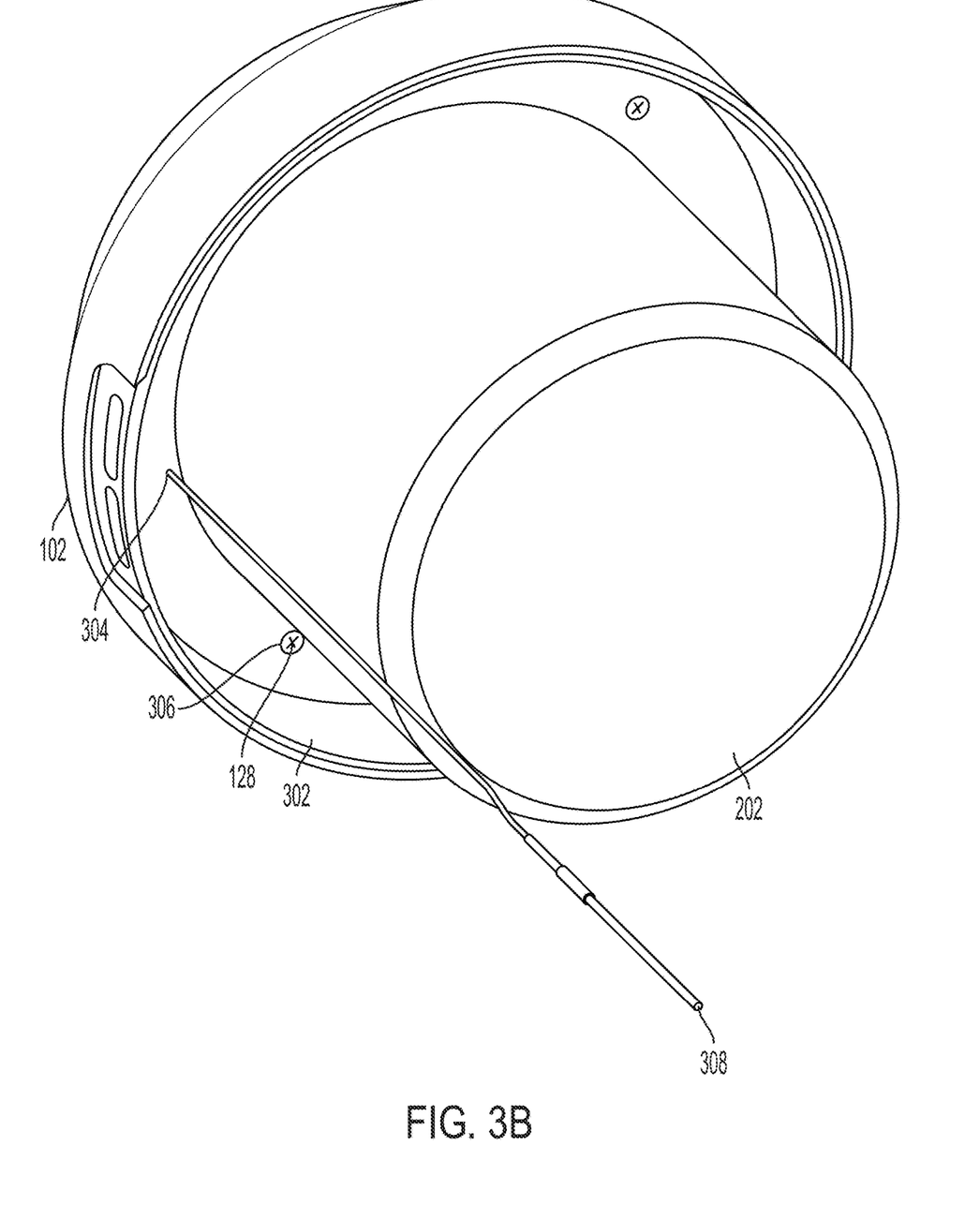
FIG. 3B shows a bottom perspective view of the dry vapor shipper vapor plug adapter of FIGS. 1A-1B coupled to the vapor plug according to an aspect of the invention.

The pocket 116 may have an access port or opening 130 positioned on the bottom surface of the pocket 116. The access port or opening 130 allows a wire of the sensor 308, as shown in FIG. 3B for example, to pass through and electrically and/or mechanically couple with the electronic and/or monitoring device 404 that resides within the recessed portion 118 of the pocket 116. For example, a sensor 308 may be positioned within a dewar 402 and be coupled with the electronic and/or monitoring device 404 that sits in the recessed portion 118 of the pocket 116 via a wire or other cable that passes through the access port or opening 130 to electrically couple the sensor 308 and electronic and/or monitoring device 404.

The access port or opening 130 may allow the sensor 308, such as a thermocouple or a wire of the thermocouple, to extend directly straight into the payload area of the dewar 402. By allowing the thermocouple and/or thermocouple wire to extend directly straight into the payload area of the dewar 402 and not snake through and/or around a side of the vapor plug 202, the access port or opening 130 prevents the thermocouple and/or thermocouple wire from getting intertwined or caught up around the vapor plug adapter 100 and/or the vapor plug 202 when the vapor plug adapter 100 and/or the vapor plug 202 is being inserted and/or removed from within the neck of the dewar 402.

The bottom portion 112 of the vapor plug lid 102 may have one or more hollow protrusions 126, as shown in FIG. 1B for example. The one or more hollow protrusions 126 may receive a fastener, such as a screw 128. The screw 128 may be fastened through an opening within a frame 302 that interfaces the vapor plug lid 102 with the vapor plug 202, as shown in FIGS. 3A-3B for example.

The vapor plug adapter 100 includes a lid cover 104 that couples, snaps on or otherwise fastens to the vapor plug lid 102 to cover and protect the electronic and/or monitoring device 404 and/or the sensor 308. The lid cover 104 may be placed and rest within the pocket 116 such that the lid cover 104 is planar with the top portion 106 of the vapor plug lid 102. The lid cover 104 may be transparent or semi-transparent to allow the display 406 of the electronic and/or monitoring device 404 to be viewed when the lid cover 104 is coupled to the vapor plug lid 102 and covers and/or encloses the electronic and/or monitoring device 404 within the vapor plug adapter 100. The lid cover 104 allows the vapor plug adapter 100 to enclose the electronic and/or monitoring device 404 and/or the sensor 308 within and protects the electronic and/or monitoring device 404 and/or the sensor 308 from cryogenic temperatures and/or other hazards during shipment of the dewar 402 while providing monitoring capabilities.

The lid cover 104 may have an outer circumference that is less than the circumference of the top portion 106 so that the lid cover 104 may be inserted within the vapor plug lid 102. The lid cover 104 may slide, be inserted within or otherwise received by the top portion 106 of the vapor plug lid 102 and rest within the pocket 116. When the lid cover 104 is inserted within or otherwise received by the top portion 106 of the vapor plug lid 102 and rests within the pocket 116, the lid cover 104 may be twisted, turned or otherwise rotated clockwise or counter-clockwise to lock or unlock the lid cover 104 from the vapor plug lid 102 to be inserted or removed from the pocket 116.

The lid cover 104 may have one or more protrusions 122. The one or more protrusions 122 may be positioned on the side and along the circumference of the lid cover 104. The one or more protrusions 122 may have a dow pin and spring mechanism that retracts when the dow pin is pushed inward toward a central origin of the lid cover 104 when the lid cover 104 is inserted into the pocket 116 of the vapor plug lid 102. The dow pin may extend outward against the vapor plug lid 102 when the lid cover 104 is inserted within the one or more lid cover notches 120 of the vapor plug lid 102.

The one or more protrusions 122 may interface with the one or more lid cover notches 120 to lock, unlock, remove and/or insert the lid cover 104 within the pocket 116. For example, the one or more protrusions 122 may be aligned with the one or more lid cover notches 120 positioned along the inner circumference of the pocket 116 such that the one or more protrusions 122 are inserted into and received by the vertical channel 120a of the one or more lid cover notches 120. When the one or more protrusions 122 are inserted into and received by the vertical channel 120a, the lid cover 104 may rest within the pocket 116 of the vapor plug lid 102. Then, the lid cover 104 may be rotated or twisted clockwise or counter-clockwise to slide or move the one or more protrusions 122 laterally and parallel to a planar surface of the pocket 116 along the lateral channel 120b of the one or more lid cover notches 120.

The lid cover 104 may have one or more recesses or openings (hereinafter, referred to as "openings") 134a-b. The one or more openings 134a-b allow a person to place or insert their finger or other object within to grasp, hold, clinch or clasp the lid cover 104. Once the person inserts their finger within the one or more openings 134a-b, the person may rotate, twist or turn their finger or other object in a counter-clockwise or clockwise direction to lock or unlock the lid cover 104.

The vapor plug adapter 100 may include one or more markings 132a-b. The one or more markings 132a-b may be positioned on the lid cover 104 and/or the vapor plug lid 102. The one or more markings 132a-b may provide information to a person using the vapor plug adapter 100. For example, the marking 132a may be positioned on a top surface of the vapor plug lid 102. The marking 132a may be marked as "OPEN" and may indicate the position of the vertical channel 120a. When the one or more protrusions 122 are aligned with the vertical channel 120a, the one or more protrusions 122 may be inserted to seat the lid cover 104 within the pocket 116 or the one or more protrusions 122 may be removed to unseat or remove the lid cover 104 from the pocket 116. In another example, the marking 132b may be marked as "CLOSED" and may indicate the position of a distal end of the lateral channel 120b. When the lid cover 104 is seated within the pocket 116, the lid cover 104 may be twisted or rotated such that the one or more protrusions are slid within the lateral channel 120b toward the distal end, which locks the lid cover 104 within the pocket 116 and prevents the lid cover 104 from being removed.

FIG. 2 shows the vapor plug lid 102 fitted onto the vapor plug 202 and the various diameters of the circumferences of the different portions. The top portion 106, the middle portion 108 and the overhang 110 may each have a cross-sectional area that has a circumference about a longitudinal axis through a center origin of the vapor plug lid 102 that aligns with the center origin of the vapor plug 202 when fitted onto the vapor plug 202. The diameter 204 of the circumference of the cross-sectional area of the top portion 106 may be less than the diameter 206 of the circumference of the cross-sectional area of the middle portion 108 due to the middle portion 108 being angled outward toward the overhang 110. Since the middle portion 108 may be angled outward, water may runoff or be directed off the vapor plug adapter 100 and away from the vapor plug 202. The diameter 204 may also be slightly greater than or equal to the diameter 210 of the circumference of the cross-sectional area of the vapor plug 202 that the vapor plug adapter 100 is to be fitted on. The diameter 206 of the cross-sectional area of the middle portion 108 may be less than the diameter 208 of the circumference of the cross-sectional area of the overhang 110.

FIG. 3A shows an exploded view of the vapor plug adapter 100 along with the vapor plug 202 with the frame 302, and FIG. 3B shows an underside of the vapor plug adapter 100 with the vapor plug lid 102, the frame 302 and the vapor plug 202 coupled together. When the vapor plug lid 102 is fitted onto the vapor plug 202, the vapor plug lid 102 may be fitted onto a frame 302 of the vapor plug 202, as shown in FIGS. 3A-3B for example. The frame 302 may be positioned in between the vapor plug lid 102 of the vapor plug adapter 100 and the vapor plug 202 and may provide an interface between the vapor plug adapter 100 and the vapor plug 202.

The frame 302 has one or more sensor openings 304 that allow a sensor 308 or a wire of the sensor 308 to access the pocket 116 of the vapor plug lid 102 where the electronic and/or monitoring device 404 is seated or resides. This allows the sensor 308 to be inserted into the payload area of the dewar 402 and remain coupled to the electronic and/or monitoring device 404 situated within the enclosure of the pocket 116 of the vapor plug lid 102, as shown in FIG. 4 for example.

The frame 302 may have one or more fastener openings 306. The one or more fastener openings 306 provide access for a screw 128 to be inserted within and through the one or more fastener openings 306 to the one or more hollow protrusions 126 of the vapor plug lid 102. When the screw 128 is inserted within and through the one or more fastener openings 306 and fastened to the one or more hollow protrusions 126, the screw 128 couples together the frame 302 of the vapor plug 202 with the vapor plug adapter 100 so that the vapor plug adapter 100 is fitted on the vapor plug 202. The frame 302 may have different shapes and/or sizes so that the frame 302 may be fitted onto various vapor plugs 202 of different shapes and/or sizes. The vapor plug adapter 100 may be coupled to the frame 302 so that the vapor plug adapter 100 is adapted to be fitted onto the various vapor plugs 202 of various dry vapor shippers.

FIG. 4 shows a vapor plug system 400. The vapor plug system 400 includes the vapor plug adapter 100, a vapor plug 202 and a dry vapor shipper, such as the dewar 402. The vapor plug adapter 100 may be modified or retro-fitted onto various different vapor plugs 202 of various dewars 402 of various shapes and/or sizes. The vapor plug adapter 100 may enclose various electronic and/or monitoring devices 404 within the vapor plug adapter 100 and/or various sensors 308 within the dewar 402, the vapor plug 202 and/or the vapor plug adapter 100.

The various types of electronic and/or monitoring devices 404 may include different types of data loggers. The electronic and/or monitoring device 404 may have a user interface including a display 406, a memory, a communication device and/or a data processor. The data processor may use the display 406 to render information onto the display 406, such as a notification or indication of monitoring data, location data, sensor data or other characteristic of the shipment or dewar 402. The data processor may provide the information to the communication device to provide, transmit or otherwise send the information to a web portal to display to a customer. For example, different data loggers may include a low-end model, which measures the internal temperature of the dewar 402, a mid-grade model, which tracks the tip, tilt, shock, or location of the dewar 402, and a slightly higher end model, which includes a communication device that provides wireless communication and networking capabilities with a web portal or other remote device.

The various sensors 308 may measure or determine a condition, a location or other characteristic of the shipment or dry vapor shipper. The various sensors 308 include a thermocouple that measures an internal or an external temperature of the shipping container, a global positioning system that determines the location of a dry vapor shipper, such as a dewar 402, a pressure sensor that measures an atmospheric pressure within the dewar 402, an inclinometer that measures tilt of the dewar 402 or a piezoelectric that measures shock within or to the dewar 402. Other sensors may include a sensor that measures the humidity within or surrounding the dewar 402 during shipment or an accelerometer or inertia measurement unit that measures the motion of the dewar 402 during shipment.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vapor plug system, comprising:
a vapor plug configured to fit onto a shipper and partially seal contents within a payload area of the shipper;
a sensor configured to measure or determine a condition or location of the shipper;
an electronic device coupled to the sensor and configured to provide the condition or the location to a user; and
a vapor plug adapter coupled to the vapor plug and configured to cover the vapor plug, the vapor plug adapter including:
a recessed pocket configured to receive the electronic device, and
an opening within the recessed pocket that is configured to receive the sensor and allow the sensor to be inserted into the payload area of the shipper,
wherein the vapor plug adapter has a cover, and
wherein the cover is configured to fit within the recessed pocket and enclose the electronic device and the sensor within the vapor plug adapter, the vapor plug and the shipper.

2. The vapor plug system of claim 1, wherein the sensor is a thermocouple configured to measure an internal or an external temperature of the shipper, a global positioning system configured to determine the location of the shipper, a pressure sensor configured to measure an atmospheric pressure within the shipper, an inclinometer configured to measure tilt of the shipper or a piezoelectric configured to measure shock within or to the shipper.

3. The vapor plug system of claim 1, wherein the sensor is a thermocouple that has a wire, wherein the opening receives the wire that is inserted into the payload area of the shipper.

4. The vapor plug system of claim 1, wherein the vapor plug adapter has a lid that includes the recessed pocket and the opening.

5. The vapor plug system of claim 1, wherein the shipper is a dewar designed to withstand cryogenic temperatures.

6. The vapor plug system of claim 5, wherein the electronic device is a data logger and the vapor plug adapter is configured to integrate with various types of data loggers, sensors and dewars of different sizes and shapes.

7. A vapor plug adapter, comprising:
a vapor plug lid having a recessed pocket configured to receive an electronic device and having an opening, the opening being configured to receive a sensor and allow the sensor to be inserted into a payload area of a dewar; and a cover configured to cover and enclose the electronic device within the recessed pocket, wherein the recessed pocket is configured to receive the cover, wherein the cover is configured to be locked or unlocked within a seat of the recessed pocket, wherein the recessed pocket has an opening that is configured to receive a wire of the sensor into the payload area of the dewar.

8. The vapor plug adapter of claim 7, wherein the vapor plug lid configured to couple with a frame of a vapor plug of the dewar.

9. The vapor plug adapter of claim 7, wherein the recessed pocket is configured to receive different types of data loggers and monitoring devices and couple with different types of vapor plugs or lids of various dewars of different sizes and shapes.

10. The vapor plug adapter of claim 7, wherein the cover has a first hole and a second hole, wherein the first hole and the second hole are configured to be gripped, held or twisted to twist the cover clockwise or counter-clockwise to a closed position or an open position when the cover is positioned to cover and enclose the electronic device within the recessed pocket.

11. The vapor plug adapter of claim 7, wherein when the cover is in the closed position the cover is prevented from being lifted out of the recessed pocket and when the cover is in the open position the cover is removable from the recessed pocket.

12. A vapor plug system, comprising:
a dewar;
a vapor plug configured to couple with the dewar;
a sensor configured to measure or determine a condition or location of the dewar;
a data logger coupled to the sensor and configured to provide the condition or the location to a user; and
an adapter coupled to the vapor plug and configured to cover the vapor plug, the adapter including:
a lid having a pocket recessed that is configured to receive the datalogger, the pocket having an opening within and configured to receive the sensor and allow the sensor to be inserted into a payload area of the dewar,
wherein the sensor is a thermocouple configured to measure an internal or an external temperature of the dewar, a global positioning system configured to determine the location of the dewar, a pressure sensor configured to measure an atmospheric pressure within the dewar, an inclinometer configured to measure tilt of the dewar or a piezoelectric to measure shock within or to the dewar.

13. The vapor plug system of claim 12, wherein the adapter includes:
a cover configured to fit over the pocket and enclose the datalogger and the sensor within the adapter, the vapor plug and the dewar.

14. The vapor plug system of claim 13, wherein the adapter includes:
a frame coupled in between the lid and the vapor plug, wherein the sensor is configured to be inserted into the opening within the pocket and an opening within the frame and into the payload area of the dewar.

15. The vapor plug system of claim 12, wherein the lid is made from a polymer that is resistant to cryogenic temperatures.

* * * * *